(12) United States Patent
Takimoto et al.

(10) Patent No.: US 12,338,852 B2
(45) Date of Patent: Jun. 24, 2025

(54) JOINED BODY

(71) Applicant: NHK Spring Co., Ltd., Yokohama (JP)

(72) Inventors: Masaru Takimoto, Kanagawa (JP); Toshihiko Hanamachi, Kanagawa (JP); Junichi Nakayama, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 583 days.

(21) Appl. No.: 17/271,765

(22) PCT Filed: Oct. 23, 2019

(86) PCT No.: PCT/JP2019/041542
§ 371 (c)(1),
(2) Date: Feb. 26, 2021

(87) PCT Pub. No.: WO2020/085389
PCT Pub. Date: Apr. 30, 2020

(65) Prior Publication Data
US 2021/0324889 A1    Oct. 21, 2021

(30) Foreign Application Priority Data

Oct. 25, 2018    (JP) .................................. 2018-201202

(51) Int. Cl.
*B23K 20/00*    (2006.01)
*B23K 20/12*    (2006.01)
(Continued)

(52) U.S. Cl.
CPC .............. *F16B 5/06* (2013.01); *B23K 20/122* (2013.01); *F28F 3/12* (2013.01); *B23K 2101/14* (2018.08); *F28F 2275/062* (2013.01)

(58) Field of Classification Search
CPC ......... F16B 5/06; F28F 3/12; F28F 2275/062; B23K 2101/14; B23K 20/1265;
(Continued)

(56) References Cited

U.S. PATENT DOCUMENTS

| 6,923,362 B2 * | 8/2005 | Mishra ............... | B23K 20/1255 |
| | | | 228/2.1 |
| 7,740,162 B2 * | 6/2010 | Ilyushenko ........ | B23K 20/1275 |
| | | | 228/2.1 |

(Continued)

FOREIGN PATENT DOCUMENTS

| CN | 101281007 A | * 10/2008 | ......... B23K 20/1225 |
| EP | 1884308 A1 | * 2/2008 | ........... B23K 20/125 |

(Continued)

OTHER PUBLICATIONS

Supplementary European Search Report dated Jul. 29, 2022, issued In the corresponding European patent application No. 19875649.6.

(Continued)

*Primary Examiner* — Kiley S Stoner
(74) *Attorney, Agent, or Firm* — Troutman Pepper Locke LLP

(57) ABSTRACT

A joined body includes: a main body section including a wall section forming a passage along which a medium for accelerating heat exchange flows; and a cover configured to cover a surface of the main body section, the cover including: a covering section provided on a side facing the main body section and configured to cover the surface; a groove section provided on the side facing the main body section and configured to accommodate an end portion of the wall section; and a stirred joint section provided on a side opposite to a side where the covering section and the groove section are provided, the stirred joint section being at least partly frictionally stirred by a depth reaching a bottom of the groove section from a surface on a side opposite to the side facing the main body section and bonded to the end portion of the wall section.

2 Claims, 5 Drawing Sheets

(51) Int. Cl.
*F16B 5/06* (2006.01)
*F28F 3/12* (2006.01)
*B23K 101/14* (2006.01)

(58) Field of Classification Search
CPC ...... B23K 20/122–128; B23K 2103/10; B23K 20/12; B23K 2103/16
USPC .............................. 228/112.1–114.5, 2.1–2.3
See application file for complete search history.

(56) References Cited

U.S. PATENT DOCUMENTS

| | | | |
|---|---|---|---|
| 8,220,693 B2* | 7/2012 | Krajewski | C23C 26/00 228/159 |
| 8,820,610 B2* | 9/2014 | Hangai | C22C 21/06 228/112.1 |
| 10,093,075 B2 | 10/2018 | Mochizuki et al. | |
| 10,583,519 B2 | 3/2020 | Litwinski | |
| 10,668,559 B2* | 6/2020 | Hori | B23K 20/126 |
| 11,185,945 B2* | 11/2021 | Hori | B23K 20/1265 |
| 11,185,946 B2* | 11/2021 | Hori | B23K 20/122 |
| 2002/0153130 A1* | 10/2002 | Okamoto | B23P 15/26 165/170 |
| 2005/0199372 A1* | 9/2005 | Frazer | H01L 21/4882 165/170 |
| 2006/0065698 A1* | 3/2006 | Ishikawa | B23K 20/1265 228/2.1 |
| 2008/0135405 A1 | 6/2008 | Hori et al. | |
| 2008/0245517 A1 | 10/2008 | Ishikawa et al. | |
| 2009/0072007 A1* | 3/2009 | Nagano | B23K 20/1255 228/2.1 |
| 2010/0096438 A1* | 4/2010 | Sato | B23K 20/122 228/114 |
| 2010/0101768 A1* | 4/2010 | Seo | B23K 20/1225 29/890.038 |
| 2011/0308059 A1* | 12/2011 | Seo | B23P 15/26 29/428 |
| 2012/0321904 A1* | 12/2012 | Ishibashi | B23K 20/1265 428/600 |
| 2015/0273637 A1* | 10/2015 | Hori | B23K 20/122 29/890.03 |
| 2015/0291273 A1* | 10/2015 | Elze | B23K 31/02 228/114 |
| 2016/0325374 A1* | 11/2016 | Hori | B23K 20/1235 |
| 2018/0043464 A1 | 2/2018 | Litwinski | |
| 2018/0243858 A1* | 8/2018 | Hori | B23K 20/1225 |
| 2018/0250767 A1* | 9/2018 | Hori | B23K 20/124 |
| 2018/0272479 A1* | 9/2018 | Hori | B23K 20/1265 |
| 2019/0126561 A1* | 5/2019 | Whalen | B29C 65/0681 |

FOREIGN PATENT DOCUMENTS

| | | | | |
|---|---|---|---|---|
| EP | 1498211 | B1 | | 7/2008 |
| JP | 2001-246482 | A | | 9/2001 |
| JP | 2004009113 | A | * | 1/2004 |
| JP | 2006-239720 | A | | 9/2006 |
| JP | 2008-254047 | A | | 10/2008 |
| JP | 2010179349 | A | * | 8/2010 |
| JP | 2013126678 | A | * | 6/2013 | ........... B23K 20/122 |
| JP | 2015131321 | A | * | 7/2015 | ......... B23K 20/1235 |
| JP | 2015131323 | A | * | 7/2015 |
| JP | 2015139800 | A | * | 8/2015 |
| JP | 2016087649 | A | * | 5/2016 | ......... B23K 20/1265 |
| JP | 2016087650 | A | * | 5/2016 | ......... B23K 20/1265 |
| JP | 2017-185500 | A | | 10/2017 |
| JP | 2019038008 | A | * | 3/2019 | ............ B23K 20/12 |
| JP | 2019076948 | A | * | 5/2019 | ............ B23K 20/12 |
| JP | 2019098378 | A | * | 6/2019 |
| JP | 2019141886 | A | * | 8/2019 | ............ B23K 20/12 |
| JP | 2019147180 | A | * | 9/2019 | ............ B23K 20/12 |
| JP | 2019181472 | A | * | 10/2019 | .......... B23K 20/122 |
| JP | 2019181473 | A | * | 10/2019 | ......... B23K 20/1235 |
| JP | 6885285 | B2 | * | 6/2021 | ......... B23K 20/1265 |
| JP | 2021115598 | A | * | 8/2021 | ........... B23K 20/124 |
| KR | 10-2016-0122049 | A | | 10/2016 |
| TW | 506874 | B | * | 10/2002 |
| TW | 201527020 | A | * | 7/2015 | ......... B23K 20/1235 |
| TW | 201628750 | A | * | 8/2016 | ......... B23K 20/1265 |
| WO | 2006/093125 | A1 | | 9/2006 |
| WO | WO-2017033923 | A1 | * | 3/2017 | ......... B23K 20/1235 |
| WO | WO-2018193639 | A1 | * | 10/2018 | ........... B23K 20/122 |
| WO | WO-2019038939 | A1 | * | 2/2019 | ........... B23K 20/122 |
| WO | WO-2019038969 | A1 | * | 2/2019 | ............ B23K 20/12 |
| WO | WO-2019064613 | A1 | * | 4/2019 | ......... B23K 20/1265 |
| WO | WO-2019082435 | A1 | * | 5/2019 | ............ B23K 20/12 |
| WO | WO-2019082439 | A1 | * | 5/2019 | ............ B23K 20/12 |
| WO | WO-2019123679 | A1 | * | 6/2019 | ........... B23K 20/122 |
| WO | WO-2019150610 | A1 | * | 8/2019 | ........... B23K 20/122 |
| WO | WO-2019150620 | A1 | * | 8/2019 | ......... B23K 20/1255 |
| WO | WO-2019193779 | A1 | * | 10/2019 | ......... B23K 20/1235 |
| WO | WO-2020213195 | A1 | * | 10/2020 |
| WO | WO-2020213197 | A1 | * | 10/2020 |
| WO | WO-2021100221 | A1 | * | 5/2021 |
| WO | WO-2021100222 | A1 | * | 5/2021 |
| WO | WO-2021144997 | A1 | * | 7/2021 |
| WO | WO-2021149271 | A1 | * | 7/2021 |

OTHER PUBLICATIONS

International Search Report mailed Dec. 17, 2019, issued for PCT/JP2019/041542.

Office Action dated Feb. 23, 2022, issued In the corresponding Chinese patent application No. 201980067996.9 with English translation of Cover Page and Search Report.

Office Action dated Mar. 15, 2022, issued in the corresponding Korean patent application No. 10-2021-7005684 with machine English translation.

* cited by examiner

JOINED BODY

FIELD

The present invention relates to a joined body obtained by bonding by friction stir welding.

BACKGROUND

As is known in the art, a heat exchanger plate with a cooling function for holding a workpiece has been conventionally used in a semiconductor manufacturing apparatus that fabricates semiconductors for industrial and automotive use, for example, and a liquid crystal manufacturing apparatus that fabricates liquid crystal displays. This heat exchanger plate is made of a metal or a ceramic composite, and has a main body section including therein a passage along which a heating or cooling medium moves. The main body is covered with a cover (e.g., refer to Patent Literature 1). In Patent Literature 1, a tool is introduced into the main body section from the cover side and frictionally stirs a region adjoining to the passage, thereby bonding the main body section and the cover together.

CITATION LIST

Patent Literature

Patent Literature 1: Japanese Patent Application Laid-open No. 2008-254047

SUMMARY

Technical Problem

Stirring the region adjoining to the passage, however, softens the main body section, thereby risking deforming the passage.

The present invention has been made in consideration of the above description, and aims to provide a joined body in which a main body section and a cover can be bonded together by friction stir welding with deformation of a passage suppressed.

Solution to Problem

To solve the above-described problem and achieve the object, a joined body according to the present invention includes: a main body section including a wall section, the wall section forming a passage along which a medium for accelerating heat exchange flows; and a cover configured to cover a surface of the main body section on which the passage is formed, the cover including: a covering section provided on a side facing the main body section and configured to cover the surface of the main body section on which the passage is formed; a groove section provided on the side facing the main body section and configured to accommodate an end portion of the wall section; and a stirred joint section provided on a side opposite to a side on which the covering section and the groove section are provided, the stirred joint section being at least partly frictionally stirred by a depth reaching a bottom of the groove section from a surface on a side opposite to the side facing the main body section, and the stirred joint section being bonded to the end portion of the wall section.

Moreover, in the above-described joined body according to the present invention, a relation $1 < T_1/T_2 < 3$ is satisfied, where D denotes a width of the wall section, $T_1$ denotes a thickness of the cover, and $T_2$ denotes a depth of the groove section.

Moreover, in the above-described joined body according to the present invention, the stirred joint section is formed over an entire surface of the cover on a side opposite to a main body section side.

Advantageous Effects of Invention

The present invention produces an effect in which a main body section and a cover can be bonded together by friction stir welding with deformation of a passage suppressed.

DESCRIPTION OF EMBODIMENTS

Figure 1:
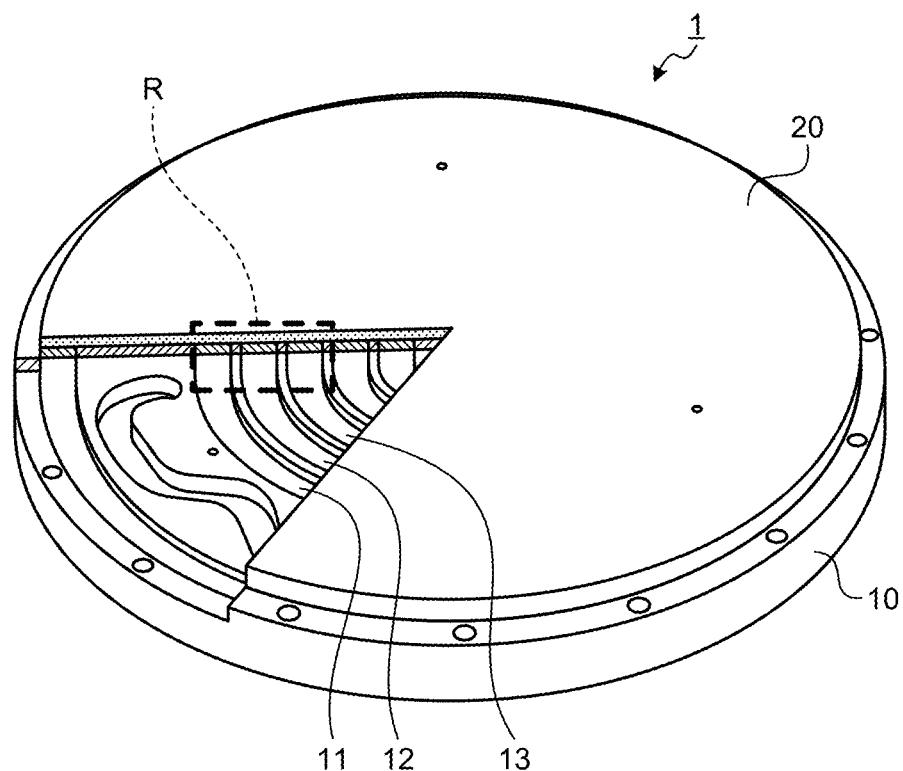
FIG. 1 is a partial sectional view of a structure of a heat exchanger plate according to an embodiment of the present invention.

An embodiment of the present invention will be described below in detail with reference to the drawings. It should be noted that the following embodiment is not intended to limit the present invention. The individual drawings to be referenced in the following description schematically illustrate shapes, sizes, and positional relations to the extent that it is possible to understand subject matters of the present invention. Therefore, the present invention is not limited to the shapes, sizes, and positional relations illustrated in the drawings.

Figure 2:
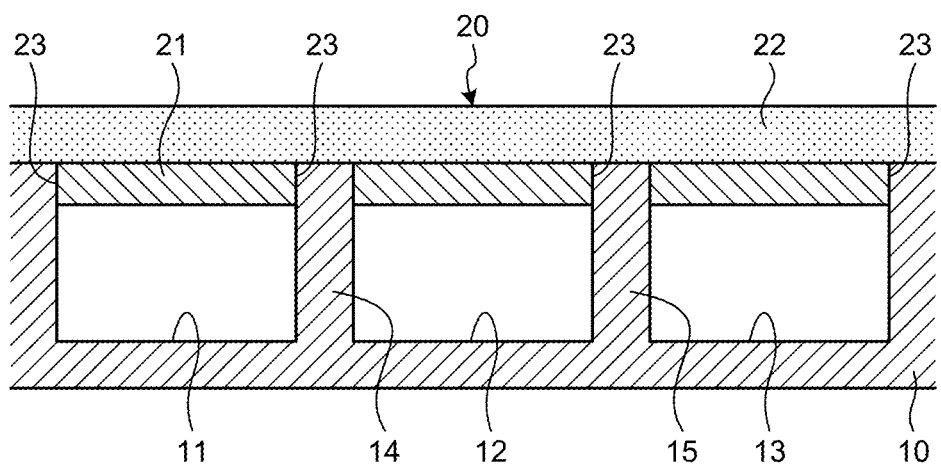
FIG. 2 is an enlarged sectional view of a region R illustrated in FIG. 1.

FIG. 1 is a partial sectional view of a structure of a heat exchanger plate according to an embodiment of the present invention. FIG. 2 is an enlarged sectional view of a region R illustrated in FIG. 1. A heat exchanger plate 1 illustrated in FIG. 1 includes: a main body section 10 having a disc shape; and a cover 20 that covers one surface (upper surface in this case) of the main body section 10. The heat exchanger plate 1 is a joined body in which the main body section 10 and the cover 20 have been bonded together by friction stir welding.

The main body section 10 has the shape of a disc made of aluminum or an aluminum alloy. The main body section 10 includes therein passages (e.g., passages 11 to 13 illustrated in FIG. 1) along which a medium for accelerating heat exchange flows. Between the passages, wall sections (e.g., wall sections 14 and 15 illustrated in FIG. 2) that protrude more than other sections are provided on a surface of the main body section 10 on which the passages are formed. The passages 11 to 13 may communicate with one another to constitute a single passage. Alternatively, at least one of the passages 11 to 13 may be an independent passage. The medium may be a liquid such as water or a gas, for example.

The cover 20 has the shape of a disc made of aluminum or an aluminum alloy. The cover 20 covers the surface of the main body section 10 on which the passages are formed.

The main body section 10 and the cover 20 are bonded together by friction stirring, details of which will be described later.

The cover 20 is provided on a side facing the main body section 10, and includes: a covering section 21 that covers the passages; and a stirred joint section 22 that is solidified after the friction stirring. The cover 20 has groove sections 23 provided on the side (covering section 21 side) facing the main body section 10, the groove sections 23 accommodating portions of the corresponding wall sections (e.g., wall sections 14 and 15) of the main body section 10. The groove sections 23 are formed along the corresponding wall sections accommodated therein.

The medium is introduced into the heat exchanger plate 1 via a medium inlet (not illustrated), then flows along the passages, and is purged from the heat exchanger plate 1 via a medium outlet (not illustrated). Heat transmitted from a heat source to the heat exchanger plate 1 is dissipated to the outside via both the main body section 10 and the cover 20 or is absorbed in the medium, which then is purged from the passages.

Figure 3:
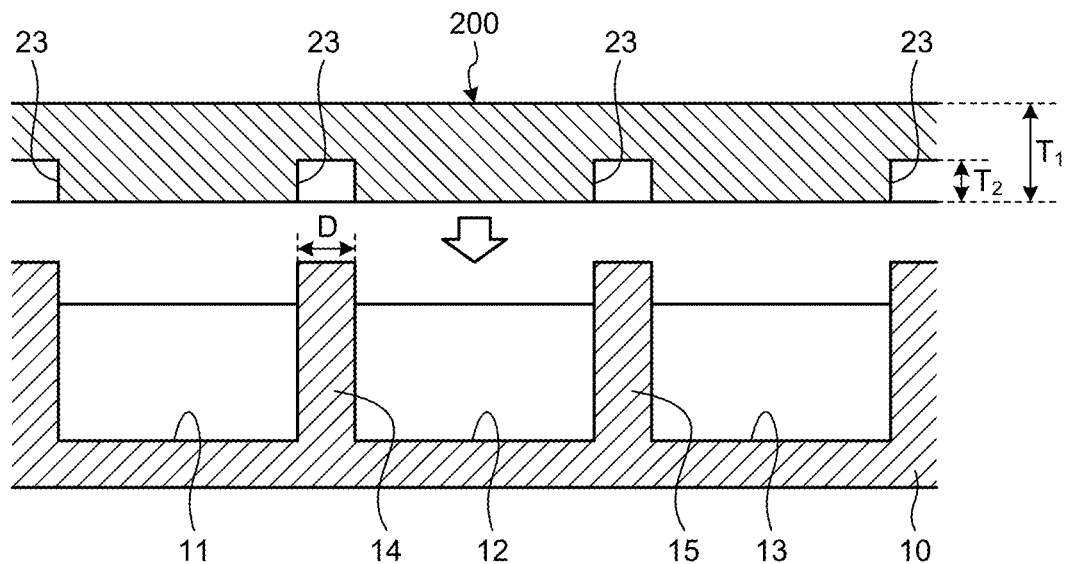
FIG. 3 is an explanatory sectional view of a method of manufacturing the heat exchanger plate according to the embodiment of the present invention.
Figure 4:
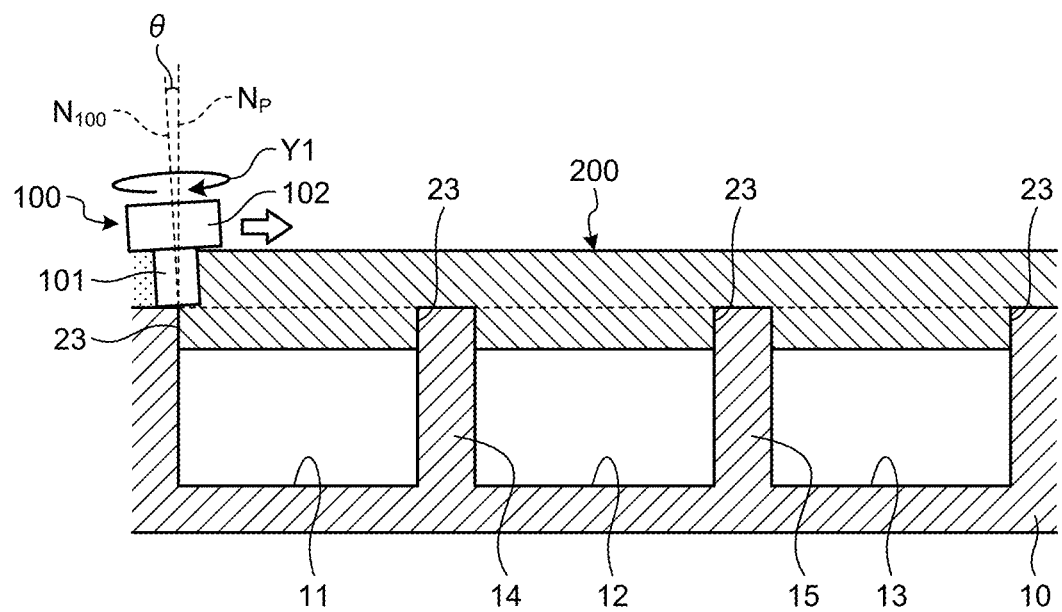
FIG. 4 is an explanatory sectional view of the method of manufacturing the heat exchanger plate according to the embodiment of the present invention.

Next, a description will be given of a method of manufacturing the heat exchanger plate 1. FIGS. 3 and 4 are each an explanatory sectional view of a method of manufacturing the heat exchanger plate according to the embodiment of the present invention.

First, the main body section 10 in which the passages (e.g., passages 11 to 13) and the wall sections (e.g., wall sections 14 and 15) described above are formed is prepared. In addition, a cover base material 200, from which the cover 20 is to be formed, is prepared (refer to FIG. 3). Then, the cover base material 200 is placed over the main body section 10. At this time, end portions of the wall sections of the main body section 10 are accommodated in the corresponding groove sections 23 formed in the cover base material 200.

Herein, a width of the wall sections (the distance between the passages) of the main body section 10 is denoted by D, a thickness of the cover base material 200 is denoted by $T_1$, and a depth of the groove sections 23 in the cover base material 200 is denoted by $T_2$ (refer to FIG. 3). The width D of the wall sections, the thickness $T_1$ of the cover base material 200, and the depth $T_2$ of the groove sections 23 in the cover base material 200 satisfy the relations below:

$T_2/D > 1$, and $1 < T_1/T_2 < 3$.

Subsequently, the main body section 10 and the cover base material 200 are bonded together by the friction stirring (refer to FIG. 4). In the friction stirring, a stirring member 100 is used to perform a process of stirring the cover base material 200. The stirring member 100 has a shoulder 102, an end of which is provided with a probe 101 that is coaxial to the shoulder 102. Each of the probe 101 and the shoulder 102 has a cylindrical shape; the probe 101 has a smaller outer diameter than that of the shoulder 102. The shoulder 102 is rotatable around its own central axis N100 (in the direction of an arrow Y1). When the shoulder 102 rotates, the probe 101 attached to the shoulder 102 also rotates together.

In the above case, the stirring member 100 is preferably inclined so that the central axis $N_{100}$ forms an angle θ with an axis $N_P$ (corresponding to a thickness direction) that is vertical to the surface of the cover base material 200. For example, the angle θ may be set to 3°. The shoulder 102 is inclined so as to face toward a side opposite to a traveling direction (the direction of a block arrow illustrated in FIG. 4) of the stirring member 100.

The stirring member 100 stirs the cover base material 200 by a depth (e.g., indicated by a broken line illustrated in FIG. 4) enough to reach the bottoms of the groove sections 23 from the surface of the cover base material 200 that is opposite to the surface on which the groove sections 23 are formed. For example, the stirring member 100 stirs the cover base material 200 by a depth $(T_1 - T_2)$ from the surface opposite to the side on which the groove sections 23 are formed.

In the friction stirring, the shoulder 102 is pressed against the surface of the cover base material 200 while rotating, thereby generating frictional heat to soften the cover base material 200 and the end portions of the wall sections of the main body section 10. The torque of the shoulder 102 causes the pressed portion and its surrounding region to plastically flow and be mixed together, and then solidify, thereby bonding the cover base material 200 and the main body section 10 together. In this way, the cover 20 with the covering section 21 and the stirred joint section 22 is formed. In this embodiment, as described above, the surface of the cover base material 200 that is opposite to the side in contact with the main body section 10 and a portion adjacent to this surface are bonded by the friction stir welding.

Using the friction stirring makes stirred metal textures finer, thereby successfully increasing their hardness compared to a casting material. In addition, the friction stirring causes less bonding residual stress and deformation than melt welding does.

In the friction stirring, the shoulder 102 stirs the entire upper surface of the cover base material 200 while rotating around the central axis $N_{100}$ (self-rotation in the direction indicated by arrow Y1 of FIG. 4).

In the joined body manufactured through the above process, a stirring amount (melting amount) of the wall sections (e.g., wall sections 14 and 15) is very small. Thus, this joined body satisfies the above relations $T_2/D > 1$ and $1 < T_1/T_2 < 3$, where D denotes the width of the wall sections of the main body section 10, $T_1$ denotes the thickness of the cover 2 (cover base material 200), and $T_2$ denotes the depth of the groove sections 23.

Figure 5:
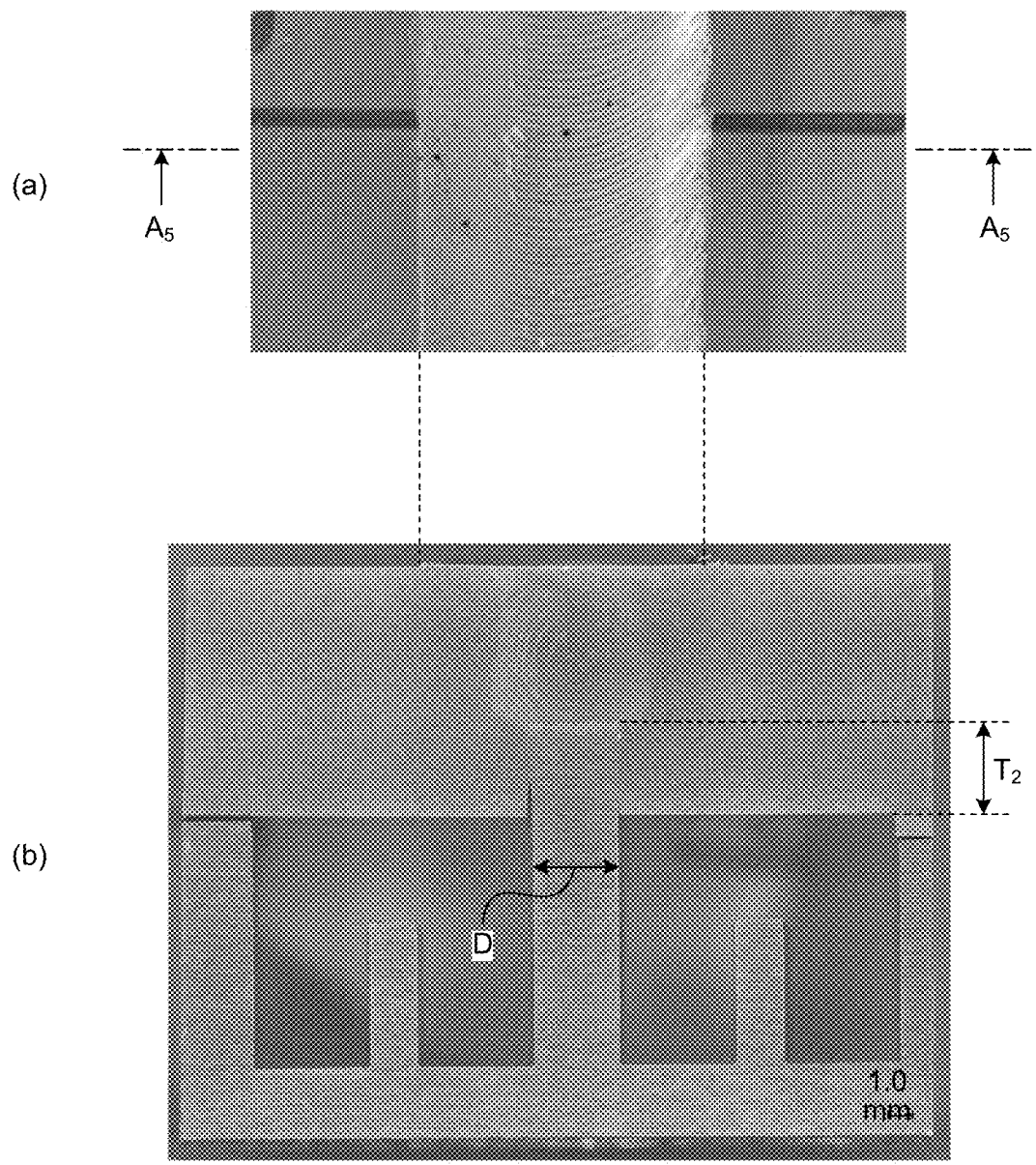
FIG. 5 is a view of a bonding result of friction stirring.
Figure 6:
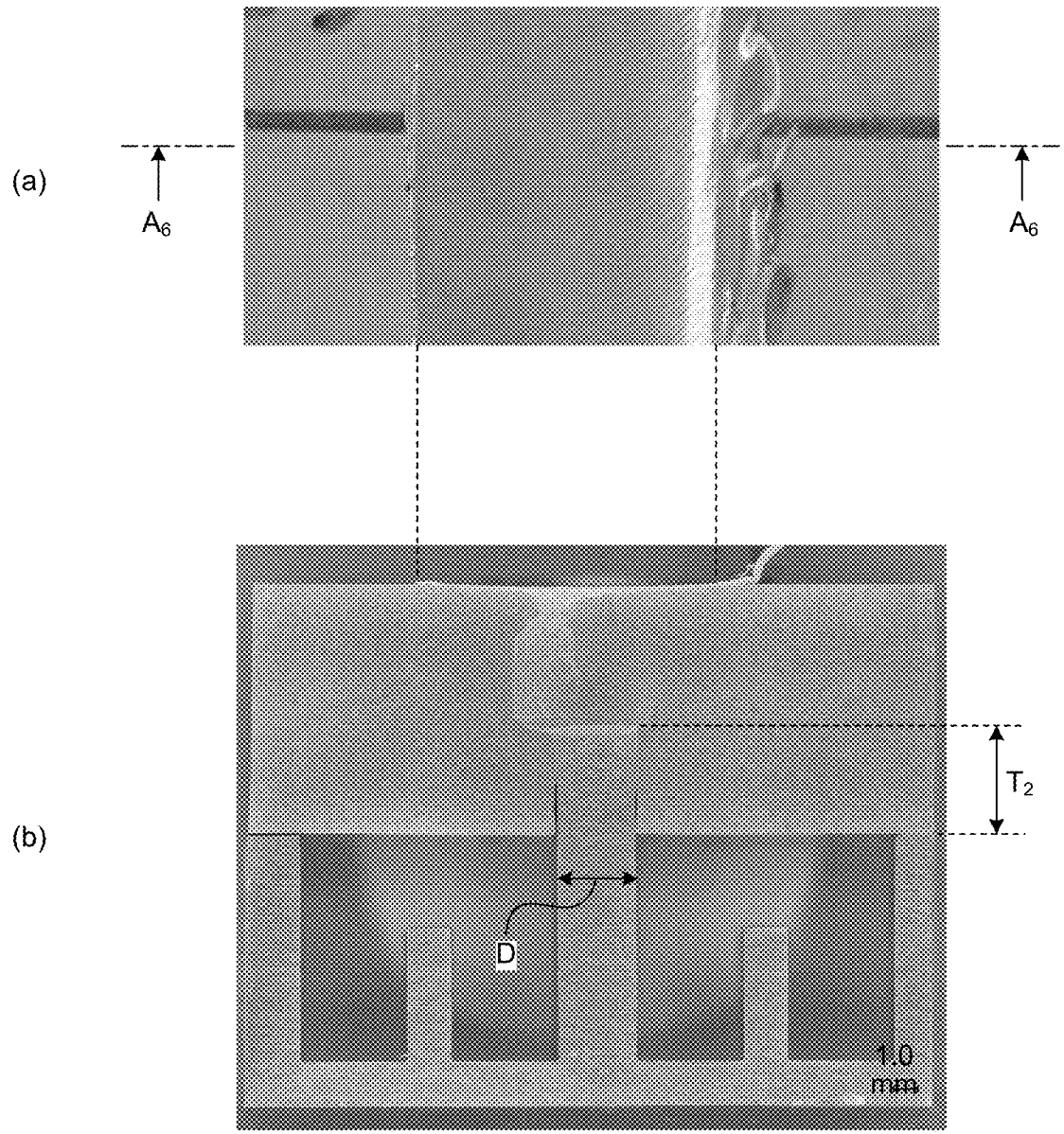
FIG. 6 is a view of a bonding result of friction stirring.
Figure 7:
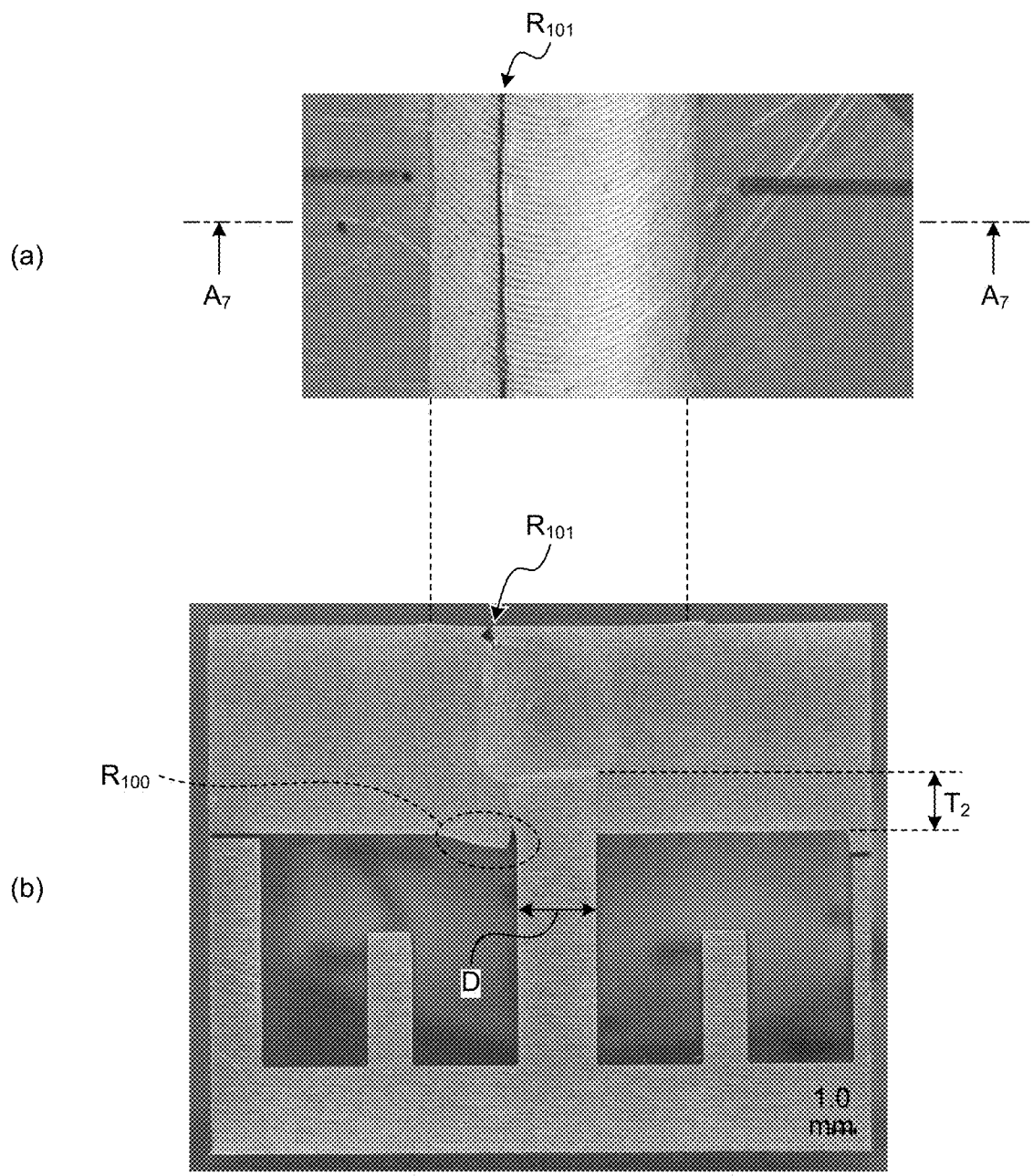
FIG. 7 is a view of a bonding result of friction stirring.

With reference to FIGS. 5 to 7, a description will be given of friction stir welding in the cases where the above relation $T_2/D > 1$ is satisfied and where the relation $T_2/D > 1$ is not satisfied. FIGS. 5 to 7 are each a view of a bonding result of the friction stirring. In FIGS. 5 to 7, respective parts (a) illustrate the upper surfaces of the joined bodies, and respective parts (b) illustrate the sections corresponding to lines $A_5$-$A_5$, $A_6$-$A_6$, and $A_7$-$A_7$. FIGS. 5 and 6 each illustrate the bonding result where the relation $T_2/D > 1$ is satisfied, whereas FIG. 7 illustrates the bonding result where the relation $T_2/D > 1$ is not satisfied. In each of the examples illustrated in FIGS. 5 to 7, the friction stirring was performed along a passage. More specifically, in the part (a) of FIG. 5, for example, a stirring member performed the friction stirring by moving in the upper direction of the drawing while rotating clockwise. In this case, a traveling speed of the stirring member was set to 400 mm/min, a rotation frequency of the stirring member was set to 1500 rpm (rotation pitch: 0.26 mm/r), and the above angle θ was set to 3°. However, these conditions can be changed as appropriate, depending on the material, the size, and other factors of a joined body.

For the bonding illustrated in FIGS. 5 to 7, test specimens (main body section) with the width D of the wall sections set to 3.6 mm were used. Furthermore, in the example illustrated in FIG. 5, the test specimen (cover base material) with the depth $T_2$ of the groove sections 23 set to 4.0 mm was used. In the example illustrated in FIG. 6, the test specimen (cover base material) with the depth $T_2$ of the groove sections 23 set to 5.0 mm was used. In the example illustrated in FIG. 7, the test specimen (cover base material) with the depth $T_2$ of the groove sections 23 set to 3.0 mm was used. FIGS. 5 and 6 satisfy the relation $T_2/D>1$, whereas FIG. 7 does not satisfy the relation $T_2/D>1$.

As can be seen from FIGS. 5 and 6, it is preferable that the relation $T_2/D>1$ be satisfied because the bonding can be performed without the passages deformed. In contrast, in FIG. 7, the deformation of members in a region $R_{100}$ and a surface defect (defect $R_{101}$) occur.

In the foregoing embodiment, portions of the cover 20 near the surface opposite to the side in contact with the main body section 10 are bonded by the friction stir welding. Thus, by frictionally stirring the cover 20 at the locations apart from the passages (e.g., passages 11 to 13) of the main body section 10, the main body section and the cover can be bonded together by the friction stir welding with deformation of the passages suppressed.

In the foregoing embodiment, the entire surface of the cover base material 200 is stirred. However, only a portion of the surface of the cover base material 200 may be stirred as long as the main body section 10 and the cover 20 can be bonded together. For example, the stirring member 100 may stir only the surface of the cover base material 200 that corresponds to the groove sections 23.

As described above, the present invention can include various embodiments, for example, that are not described herein. Thus, the present invention may undergo various design variations, for example, within the scope not departing from the technical ideas specified by the claims.

INDUSTRIAL APPLICABILITY

As described above, a joined body according to the present invention is suitable for bonding a main body section and a cover together by friction stir welding with deformation of passages suppressed.

REFERENCE SIGNS LIST 1 heat exchanger plate
10 main body section
11 to 13 passage
14, 15 wall section
20 cover
21 covering section
22 stirred joint section
23 groove section
200 cover base material

The invention claimed is:

1. A joined body comprising:
    a main body section including a wall section, the wall section forming a passage along which a medium for accelerating heat exchange flows; and
    a cover configured to cover a surface of the main body section on which the passage is formed, the cover including:
        a covering section provided on a side facing the main body section and configured to cover the surface of the main body section on which the passage is formed;
        a groove section provided on the side facing the main body section and configured to accommodate an end portion of the wall section; and
        a stirred joint section provided on a side opposite to a side on which the covering section and the groove section are provided, the stirred joint section being at least partly frictionally stirred by a depth reaching a bottom of the groove section from a surface on a side opposite to the side facing the main body section, and the stirred joint section being bonded to the end portion of the wall section,
    wherein only a portion of the cover is stirred as long as the main body section and the cover can be bonded together, and
    wherein a relation $1<T_1/T_2<3$ is satisfied,
    where $T_1$ denotes a thickness of the cover and $T_2$ denotes a depth of the groove section, and
    the stirred joint section is formed by being stirred by a depth of $T_1-T_2$ from a surface opposite to the side on which the groove sections are formed to prevent deformation of the passage.

2. The joined body according to claim 1, wherein the stirred joint section is formed over an entire surface of the cover on a side opposite to a main body section side.

* * * * *